(12) United States Patent
Bartminn (10) Patent No.: US 12,435,482 B2
(45) Date of Patent: Oct. 7, 2025

(54) WIND TURBINE FOUNDATION STRUCTURE, AND METHOD FOR PRODUCING A WIND TURBINE FOUNDATION STRUCTURE

(71) Applicant: Daniel Bartminn, Elmshorn (DE)

(72) Inventor: Daniel Bartminn, Elmshorn (DE)

( * ) Notice: Subject to any disclaimer, the term of this patent is extended or adjusted under 35 U.S.C. 154(b) by 161 days.

(21) Appl. No.: 17/756,912

(22) PCT Filed: Nov. 20, 2020

(86) PCT No.: PCT/EP2020/082862
§ 371 (c)(1),
(2) Date: Jun. 6, 2022

(87) PCT Pub. No.: WO2021/110436
PCT Pub. Date: Jun. 10, 2021

(65) Prior Publication Data
US 2023/0010802 A1   Jan. 12, 2023

(30) Foreign Application Priority Data
Dec. 5, 2019 (DE) .................... 10 2019 133 132.3

(51) Int. Cl.
*E02D 27/42* (2006.01)
*E02B 17/02* (2006.01)
(Continued)

(52) U.S. Cl.
CPC ................................. *E02D 27/425* (2013.01)

(58) Field of Classification Search
CPC ....... E02D 27/425; E02D 27/12; E02D 27/14; E02D 27/16; E02D 27/30; E02D 27/42;
(Continued)

(56) References Cited

U.S. PATENT DOCUMENTS 3,034,304 A   5/1962   Upson
4,166,347 A * 9/1979   Pohlman ................. E04G 21/12
                                                     52/301
(Continued)

FOREIGN PATENT DOCUMENTS

CN   105673355 A *  6/2016
CN   105862902 A *  8/2016 ........... E02D 27/425
(Continued)

OTHER PUBLICATIONS

International Search Report from corresponding PCT Appln. No. PCT/EP2020/082862, dated Jan. 29, 2021.
(Continued)

*Primary Examiner* — Amber R Anderson
*Assistant Examiner* — Stacy N Lawson
(74) *Attorney, Agent, or Firm* — Grossman, Tucker, Perreault & Pfleger, PLLC (57) ABSTRACT

A wind turbine foundation structure comprising a hollow structural member having a longitudinally extending circumferential wall, the wall being bounded at the top by a top end face and bounded at the bottom by a bottom end face, wherein the wall is formed from a mineral building material and in that a wall thickness of the wall tapers from the top end face towards the bottom end face.

3 Claims, 9 Drawing Sheets

(51) Int. Cl.
*E04G 13/02* (2006.01)
*E04H 12/34* (2006.01)

(58) Field of Classification Search
CPC ....... E02D 27/52; E02D 27/525; F03D 13/25; Y02E 10/727; E02B 2017/0039; E02B 2017/0065; E02B 2017/0091
See application file for complete search history.

(56) References Cited

U.S. PATENT DOCUMENTS

| | | | |
|---|---|---|---|
| 2003/0000165 A1* | 1/2003 | Tadros | E04C 3/26 52/223.14 |
| 2004/0262926 A1* | 12/2004 | Hansen | F03D 13/10 290/44 |
| 2010/0281818 A1* | 11/2010 | Southworth | E02D 27/42 52/745.17 |
| 2011/0138720 A1 | 6/2011 | Tooman et al. | |
| 2013/0212963 A1* | 8/2013 | Miks | E02D 27/425 52/223.13 |
| 2014/0033628 A1 | 2/2014 | Lockwood et al. | |
| 2017/0218652 A1* | 8/2017 | Neighbours | E04H 12/341 |
| 2017/0350372 A1* | 12/2017 | Kirkley | E04C 5/08 |
| 2018/0030961 A1* | 2/2018 | Bodanese | F03D 13/40 |
| 2022/0018079 A1* | 1/2022 | Kurstjens | E02B 17/0004 |

FOREIGN PATENT DOCUMENTS

| | | | | |
|---|---|---|---|---|
| CN | 107630513 A | * | 1/2018 | |
| KR | 2018005443 A | * | 1/2018 | ............ E02D 27/42 |
| WO | WO-2012146350 A2 | * | 11/2012 | ............ E02D 27/42 |
| WO | WO-2019207345 A1 | * | 10/2019 | |

OTHER PUBLICATIONS

International Preliminary Report on Patentability from corresponding PCT Appln. No. PCT/EP2020/082862, dated Apr. 29, 2022.

* cited by examiner

WIND TURBINE FOUNDATION STRUCTURE, AND METHOD FOR PRODUCING A WIND TURBINE FOUNDATION STRUCTURE

FIELD

The subject matter relates to a wind turbine foundation structure and methods for manufacturing such a foundation structure. Wind power plants within the meaning of the subject matter may be wind turbines, transformer stations, substations, transformer stations or the like.

BACKGROUND

Wind power plants are usually founded on hollow structural elements. The hollow structural elements are founded with a tie length between 5 m to 50 m into the ground. The hollow structural elements preferably have a length of >45 m, in particular between 50 m and 100 m. In offshore plants, the hollow structural elements are founded in such a way that they have a binding length of between 5 m and 50 m and protrude between 10 m and 30 m from the water surface.

The hollow structural elements have diameters between 4 m and 10 m. Conventionally, hollow structure elements are formed as steel cylinders driven into the seabed by pile driving or vibration. The use of steel as a material for the hollow structural elements results in high costs due to their production as well as their high dead weight. In addition, the connection with so-called "transition pieces" at the top by means of grout-20 joints or bolted joints is necessary.

It is a "so known to place" concrete piles, which are formed from solid material, by drilling. For this purpose, a hole is drilled in the ground into which the concrete pile is inserted. However, such a foundation is complex and the necessary drilling equipment is expensive.

The underlying task was to provide a foundation structure that is easy to found, has a high load-bearing capacity and can be manufactured at low cost.

SUMMARY

The subject foundation structure has a hollow structural element which extends in the longitudinal direction and is formed in the longitudinal direction by a circumferential wall. The wall has two distal ends, each bounded by end faces. A first end face may be a top end face and a second end face may be a bottom end face. Top and bottom faces may be defined by the position of the hollow structural element in the final installed state. In this case, in the installed state, the lower end face is founded in the ground and the upper end face protrudes from the ground.

The wall is formed from a mineral building material and may have a downwardly tapering wall. The wall tapers from the upper end face to the lower end face.

A wall is bounded by an inner wall and an outer wall or by an inner diameter and an outer diameter. In the following, the term "outer wall" is also used in some cases to refer to the wall. The wall is the outer boundary of the hollow structural element. The wall is in particular tubular. In a cross-section, the wall is in particular round, elliptical or oval.

This means that a displacement volume per longitudinal extension of the hollow structural element increases from the lower end face toward the upper end face. This achieves that the subject foundation structure 30 can be easily founded by pile driving or vibration. Unlike conventional concrete piles, which are made of solid material, the foundation structure in question can be founded more easily in the form of a hollow structural element. In order to keep the resistance to penetration into the ground low, the bottom face is smaller than the top face. The hollow structural element thus penetrates the ground in a wedge shape and can be driven forward more easily than a non-tapered hollow structural element or an element made of solid material.

The hollow structural element preferably has a tie length of at least 7 m. This may be sufficient to adequately base the hollow structural element in the ground. Tie lengths between 7 m and 20 m are preferred.

According to an embodiment example, it is proposed that the hollow structural element is monolithically manufactured at least over a longitudinal extension of 50%. It is also proposed that the hollow structural element is monolithically fabricated in the region of its lower end up to at least 5 m above the seabed/terrain bottom. The monolithic part of the hollow structural element is at least partially founded in the ground.

The hollow structural element may have a length extension at which the upper edge of the hollow structural element in the installed state ends at least 5 m above the seabed and in particular ends no more than 2 times the outer or inner diameter of the hollow structural element, in particular less than 3 times the outer or inner diameter of the hollow structural element above the seabed.

The monolithic end of the hollow structural element is preferably mechanically prestressed. The compressive force generated in the concrete by prestressing is such that the tensile forces occurring during driving and/or vibration of a monolithic pile of the same mass and dimension are compensated by at least 70%, in particular by at least 85%. The prestressing force is preferably that prestressing force which is determined as the net prestressing force after deduction of relaxation of the prestressing steel and/or creep and shrinkage losses in the concrete and friction losses.

The compressive force generated by prestressing in the concrete is such that the compressive force generated by prestressing in the concrete compensates (overcomes) the tensile forces occurring in a monolithic pile of the same mass and dimension during operation and/or under maximum load by at least 45%, in particular at least 65%.

Compared to steel structures, the hollow structural element in question has a wall with a greater wall thickness, which initially makes it more difficult to form by means of vibration or driving. Due to the fact that the wall tapers in a wedge shape towards the bottom, penetration into the ground is facilitated.

According to one embodiment, it is proposed that the hollow structural element is hollow cylindrical. The cylindrical shape increases the structural integrity so that the hollow structural element can support higher bending moments.

According to one embodiment, it is proposed that a wall thickness of the wall continuously tapers along at least portions of a longitudinal extent of the hollow structural element. In particular, the wall may taper continuously. By a continuous taper it is understood that no jumps or steps are present.

It is also proposed that a wall thickness of the wall tapers in steps along at least parts of a longitudinal extent of the hollow structural element. In this case, a step in the wall thickness may be formed in each case in steps, for example at intervals between 2.5 m and 15 m. However, fillets or conical transitions can be formed at the steps, so that when the hollow structural element is driven into the ground, the steps form a reasonable resistance.

The fillets or tapered transitions may be provided circumferentially on each step at a time.

According to one embodiment, it is proposed that the taper increases the inner diameter of the hollow structural element. The inner radius changes depending on the longitudinal extension of the hollow structural element, so that an inner cone is formed. In particular, the outer radius is constant along the longitudinal extension, at least in parts.

Also, it is suggested that the taper reduces the outer diameter of the hollow structural element. The outer radius changes along the longitudinal extension of the hollow structural element. In particular, the hollow structural element tapers from top to bottom. The inner radius is constant in parts of the longitudinal extent of the hollow structural element.

Also, it is suggested that both inner radius and outer radius change depending on the longitudinal extension. During tapering, the inner radius becomes larger and the outer radius becomes smaller. The gradient of the inner radius as well as the gradient of the outer radius can be equal in magnitude in longitudinal extension. That is, the inner and outer radii increase and decrease, respectively, to the same extent, depending on the longitudinal extent of the hollow structural element.

According to an embodiment example, it is proposed that the building material comprises cement at least in parts. In particular, the building material is concrete, which is mixed from cement, gravel, sand and water and is hardened after casting.

For a good load-resistance capacity, it has been found that the water-cement ratio (w/c) of the building material is <0.45, in particular <0.35 or <0.3.

The moments and shear forces occurring in wind turbines are adequately absorbed by the hollow structural element in particular if the building material has a strength class of at least C40/50, preferably C70/85, especially C100/115 according to EN 206 and EN1992.

Sufficient long-term stability of the foundation structure over the service life of the wind turbine, especially in the case of permanent penetration by water, is achieved in particular by the building material having a pore content (air voids) of less than 5%, preferably less than 3%, in particular less than 2%. The total porosity measured with mercury pressure porosity should be P28d<12 vol-% after 28 days and P90d<10 vol-% after 90 days.

Sufficient load-resistance capacity of the hollow structural element is achieved in particular by the building material having a cement content of at least 350 kg/m$^3$, preferably more than 450 kg/m$^3$, in particular more than 650 kg/m$^3$.

In particular, for the permanent penetration of water when installing the foundation structure offshore, sufficient durability is achieved by the building material having a porosity of P28d<12% by volume when measured by mercury pressure porosimetry. P28d is a measurement over 28 days. Preferably, the porosity is also less than 10 vol. %. For P90d, that is a measurement over 90 days, the porosity is preferably <10 vol %, in particular <8 vol %.

According to an embodiment example, it is proposed that the wall is mechanically prestressed. The prestressing presses over cracks and thus keeps the surfaces largely free of tensile stress, which is advantageous in the case of fluctuating torque loads in particular. The pretensioning force is preferably 5%, in particular more than 15%, greater than the compressive strength of the wall. The pretensioning force is preferably applied in the longitudinal direction.

For increased stability under dynamic environmental conditions, it is suggested that the building material be metal reinforced. The metallic reinforcement is in particular a steel reinforcement. The reinforcement can be given by fibers or reinforcing bars. Fiber reinforcement can also be achieved by carbon fiber, glass fiber or metal fiber.

The reinforcement may be such that it has at least as 26 mm preferably at least as 40 mm concrete cover at 90% of the measuring points, preferably at 98% of the measuring points.

The building material may be reinforced with ferritic stainless reinforcing steel. The reinforcement may have a chromium content not exceeding 18 M %. The reinforcement may contain molybdenum.

The material may be reinforced with austenitic stainless reinforcing steel. The reinforcement may have at least 5 M % in particular between 5 M %-14 M % nickel and/or between 12 M %-22 M % in particular 15 M %-20 M % chromium.

The building material may be reinforced with ferritic-austenitic stainless reinforcing steel. The reinforcement may have at least 18 M %, in particular between 15 M %-20 M % chromium and 2 M %-8 M % nickel and optionally molybdenum.

According to an embodiment example, it is suggested that the top end face is metal reinforced, in particular that a metal reinforcement protrudes from the top end face. Via the top face, the hollow structural element is founded in the ground, in particular driven or vibrated. This means that during the foundation itself, the mechanical load on the top end face is very high. To withstand these mechanical loads and in particular to prevent damage, a metallic reinforcement of the end face is preferred. If a circumferential web is provided that protrudes from the end face, the foundation tool, either the vibratory tool or the pile driving tool can rest on this reinforcement and not directly on the building material of the hollow structural element. Since a metallic reinforcement is considerably more ductile than a mineral building material, this prevents damage during foundation.

According to an embodiment example, it is proposed that the density of the reinforcement in an end region of the hollow structural element at its upper and/or lower end face is greater than in a central region of the hollow structural element. The mechanical load at the end faces is higher than in a center region, especially during foundation. The tool for the foundation, in particular a pile driving tool or a vibration tool, engages on the upper-side end face. At the bottom end face, the hollow structural element is driven into the ground and the bottom end face must displace the ground. At these two end faces, the reinforcement is larger, i.e. the density of the reinforcement is increased compared to a center area.

At a bottom end face, in particular, a tapered wedge may be provided that tapers away from the hollow structural member. The wedge can be formed from the building material of the hollow structural element or from a metallic material. The wedge shape of the underside makes it easier to displace the base when founding.

According to one embodiment, it is proposed that an inner diameter of the wall in an end region of the hollow structural element increases towards the top end face, in particular conically increases. This enables a grout connection with a transition piece. The end region can extend longitudinally from a front edge with at least 0.3 times, in particular 0.5 times, the inside diameter.

According to an embodiment example, it is proposed that an outer diameter of the wall in an end region of the hollow structural element decreases, in particular conically decreases, towards the upper end face. The end region can extend longitudinally from a front edge with at least 0.3 times, in particular 0.5 times, the inside diameter.

The transition piece can be inserted into the hollow structural element with a pile or cylinder element congruent to the inner diameter of the wall. An annular gap between the inner shell surface of the hollow structural element and the outer shell surface of the transition piece can be formed by webs, spacers or the like. Concrete or cement paste can be filled into this annular gap so that a firm connection is formed between the hollow structural element and the transition piece. Also, the outer diameter of the end section can decrease towards the top end face so that it tapers conically. For example, a transition piece can be slipped onto this and a grouted connection formed accordingly.

According to one embodiment, it is proposed that a radially inward-facing stop is formed on the inner lateral surface of the wall in an end region of the hollow structural element. The stop may be formed by a plurality of "ledges" formed at angular intervals from one another. In particular, the stop may be formed by radially inwardly facing projections. The stop may be partially or completely circumferential. The stop serves as a stop for the transition piece, which is inserted into the hollow structural element. A suitable axial arrangement of the stop ensures an annular gap between the inner shell surface of the hollow structural element and the outer shell surface of the transition piece, into which concrete or grout can be filled to form a grout connection. Alternatively, the plug-in connection is made without backfill from fitting connection.

For a landing platform or an installation platform, a radially outwardly facing skirt may be formed on the outer shell surface of the wall in an end region of the hollow structural member. The skirt may be partially or completely circumferential. In particular, the skirt is spaced from the upper end face in the axial direction.

The associated transition piece can be attached to the hollow structural element, in particular plugged on, in particular plugged in or plugged over. The transitionpiece may have at least one ship landing device with ladder.

For increased stability, it is proposed that the building material is sealed, in particular with a sealing film. Such a sealing foil may be, for example, an aluminum-butyl sealing foil.

In another aspect, a method of manufacturing a wind turbine foundation structure just described is provided.

Here, a formwork is first placed onshore. This formwork has an annular gap which tapers from a first end to a second end. The annular gap is radially circumferential and extends in the axial direction over the entire formwork. Liquid concrete is poured into the annular gap of the formwork and then cured. The cured concrete forms the 20 hollow structural element and the formwork can be removed.

Subsequently, after the concrete has cured, the hollow structural element is shipped to an offshore installation site. At the offshore installation site, the hollow structural element is founded into the seabed by ramming or vibrating.

In order to shorten the construction time and, in particular, the curing of the concrete, it is proposed that the concrete be cured in an autoclave. This can significantly reduce the drying time.

To increase the stability in seawater, it is suggested that the concrete be sealed. For this purpose, the surface can be vacuumed or coated, for example.

During production, the concrete of the hollow structural element can be compacted by rotation. In this process, an outer formwork may be water-permeable and/or perforated in places so that water transported outwardly by centrifugal force can escape outwardly from the formwork.

The formwork used to produce the wall is in particular slipform formwork (slipform process) or climbing formwork (jumpform process).

In order to facilitate filling with concrete and in particular to facilitate compaction of the concrete in the formwork, it is proposed that the first end of the formwork is on the bottom side and the second end of the formwork is on the top side. As a result, the first end, at which the annular gap is larger than at the second end, is bottom-side and the formwork tapers upwards from the bottom. For the foundation, the entire hollow structural element must then be rotated once by 180° so that the end face with the wall with the smaller wall thickness is at the bottom and the end face with the wall with the larger wall thickness is at the top. Subsequently, the hollow structural element can be founded by ramming or vibrating.

It is suggested that the hollow structural element be fabricated in a horizontal orientation. To minimize the number of rotations, especially offshore, it is proposed that the hollow structural element is shipped upright to the offshore installation site. Via a crane, the hollow structural element can be loaded upright onto a ship. There, at the installation site, it only has to be unloaded from the ship without turning it. This reduces the mechanical engineering effort offshore.

BRIEF DESCRIPTION OF THE DRAWINGS

The object is explained in more detail below with reference to a drawing showing examples of embodiments. The drawing shows.

DETAILED DESCRIPTION

Figure 1:
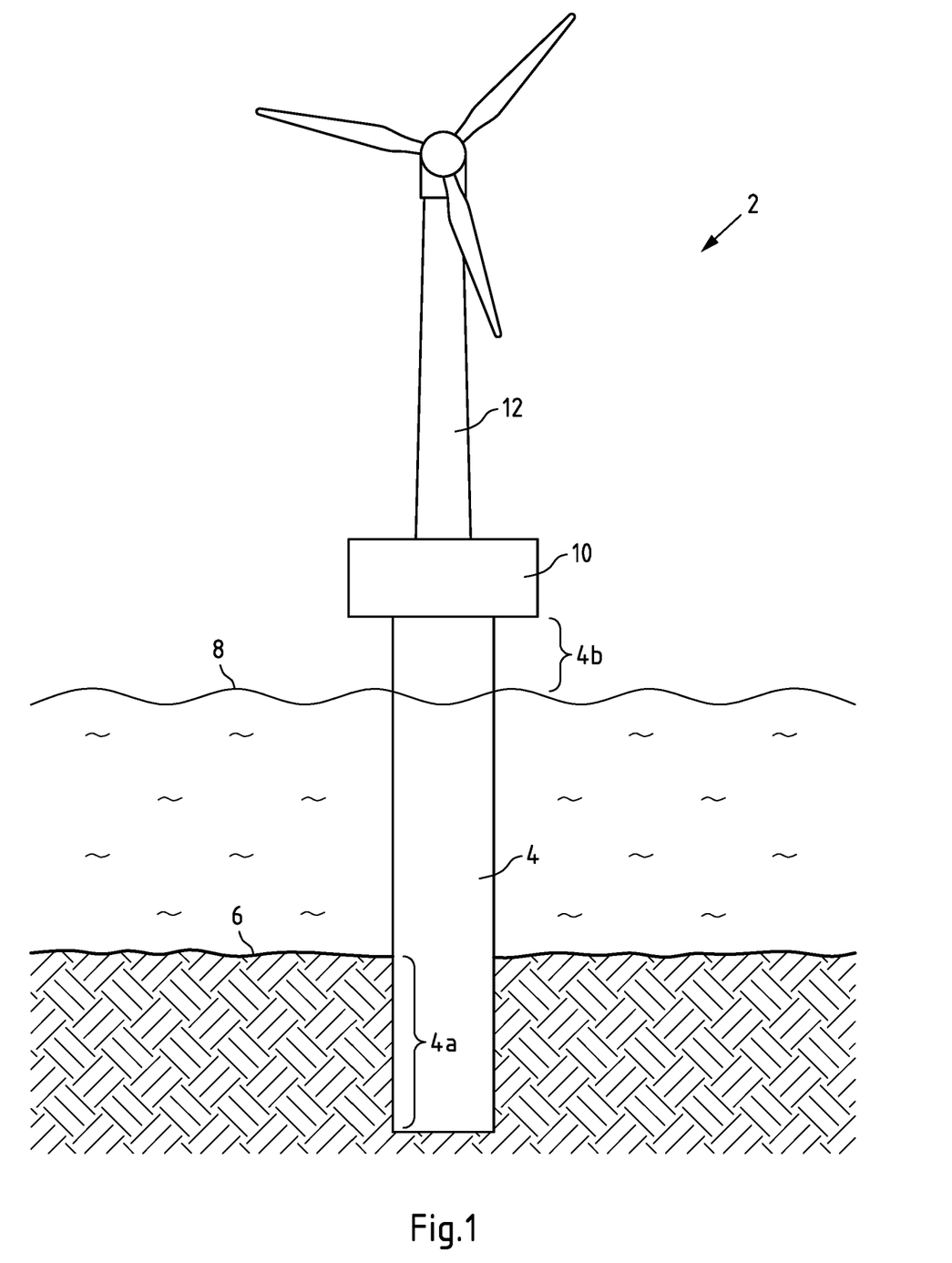
FIG. 1 is a wind turbine with a wind turbine foundation structure.

FIG. 1 shows a wind turbine 2, which is founded offshore. All statements made here apply to both offshore foundation structures and onshore foundation structures.

The wind turbine 2 is founded in a seabed 6 via a wind turbine foundation structure 4. The foundation structure 4 is founded into the seabed with an embedment length 4a. The foundation structure extends above the water surface 8 with a length 4b. The foundation structure is connected to a transition piece 10, for example via a grout connection, which is conventionally known.

A wind turbine 12 is arranged on the transition piece 10 here as an example, but a sub-station, a transformer station or the like may also be provided. For the foundation of the foundation structure 4, it is driven or vibrated into the seabed 6.

Figure 2:
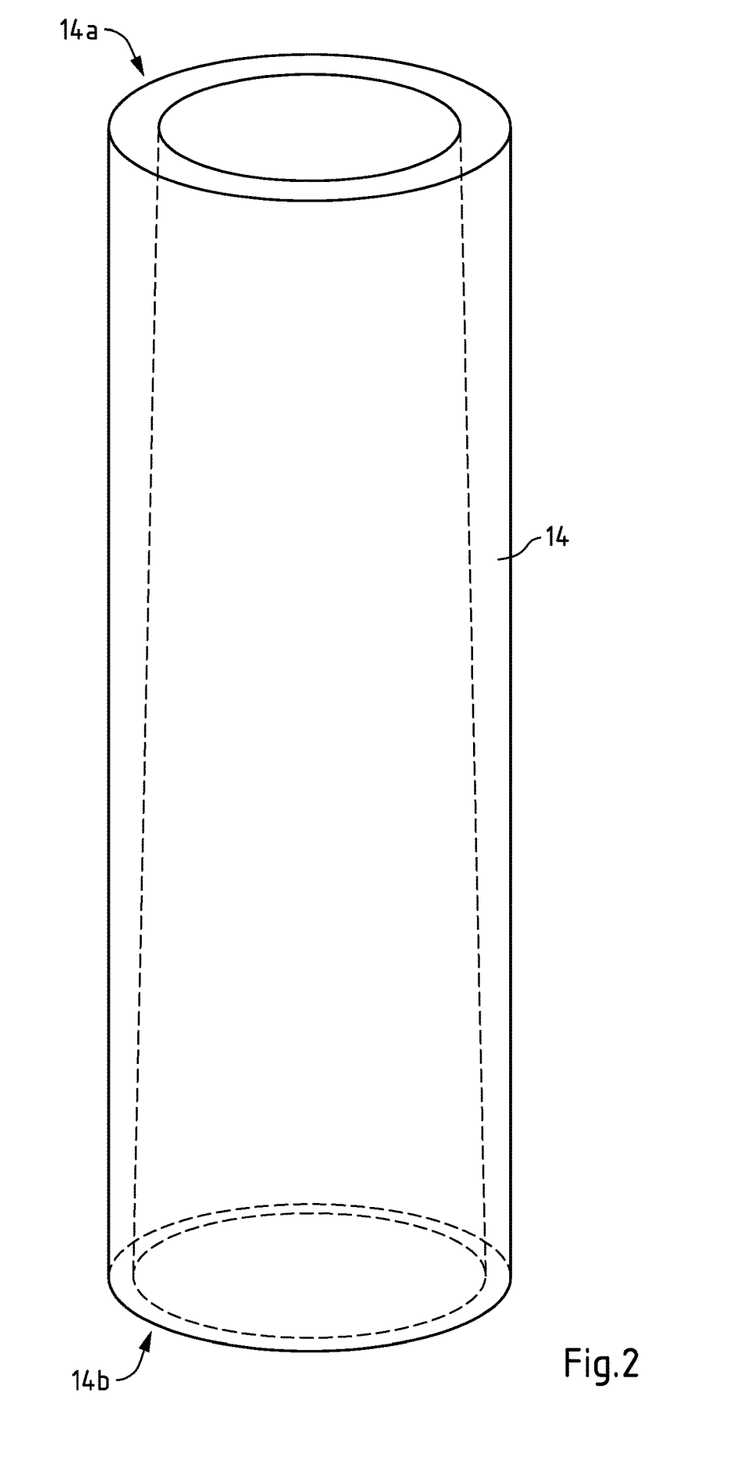
FIG. 2 is a wind turbine foundation structure according to an embodiment example.

For the present purpose, it is now proposed that the foundation structure 4 is formed of a hollow structural element 14 as shown in FIG. 2. The hollow structural element 14 is cast from concrete and has an upper end face 14a and a lower end face 14b. The hollow structural element 14 is preferably hollow cylindrical. The wall thickness of the hollow structural element 14 decreases from the upper end face 14a to the lower end face 14b. This may facilitate a grounding in the seabed 6.

Figure 3:
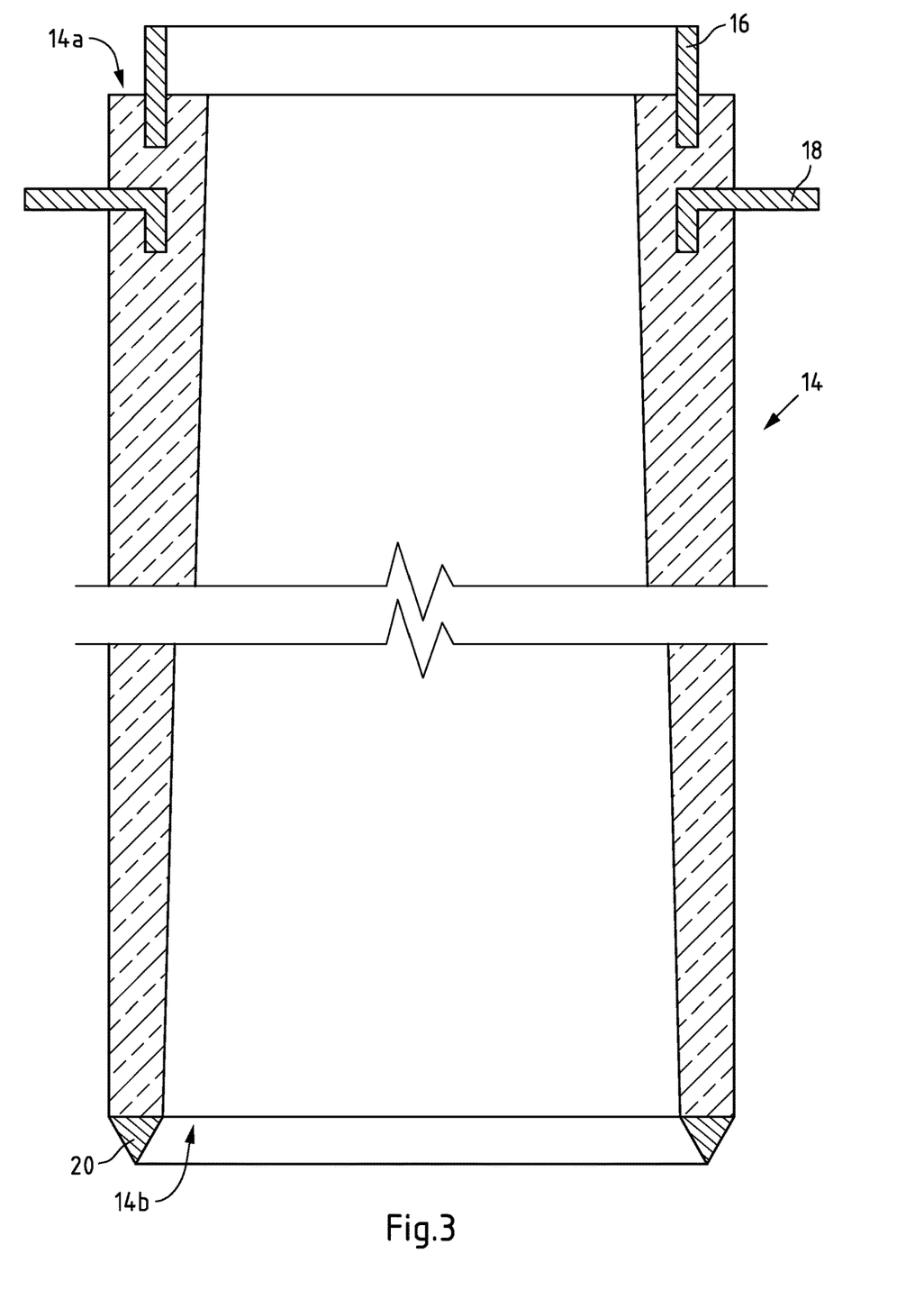
FIG. 3 is a longitudinal section through a wind turbine foundation structure according to an embodiment example.

The two distal ends of the hollow structural element 14 are shown enlarged 1 in FIG. 3. At the upper end face 14a of the hollow structural element 14, a circumferential web 16 may protrude from the upper end face 14a. This web 16 may be used to absorb pile driving forces or vibrations from the foundation tool. The web 16 is preferably formed of steel and is considerably more ductile than the concrete of the hollow structural element 14. During pile driving or vibration, the forces are absorbed by the web 16 and uniformly transmitted into the hollow structural element 14. This prevents damage to the upper end surface 14a.

A circumferential collar (also called an apron) 18 may be provided in the region of the upper end. The circumferential collar 18 may be formed as a landing structure, web or the like. The collar 18 may be spaced in the axial direction from the upper end surface 14a.

FIG. 3 further shows that the hollow structural member 14 terminates with a lower end face 14b at the lower end. The lower end face 14b has a smaller radial extent than the upper end face 14a. This is from the taper of the hollow structural element 14 from the upper end surface 14a to the lower end surface 14b. A wedge 20 may be provided at the lower end face 14b, which may be formed of steel, for example. A ground may be simplified over this wedge. The elements 16, 18 and 20 are optional.

Figure 4:
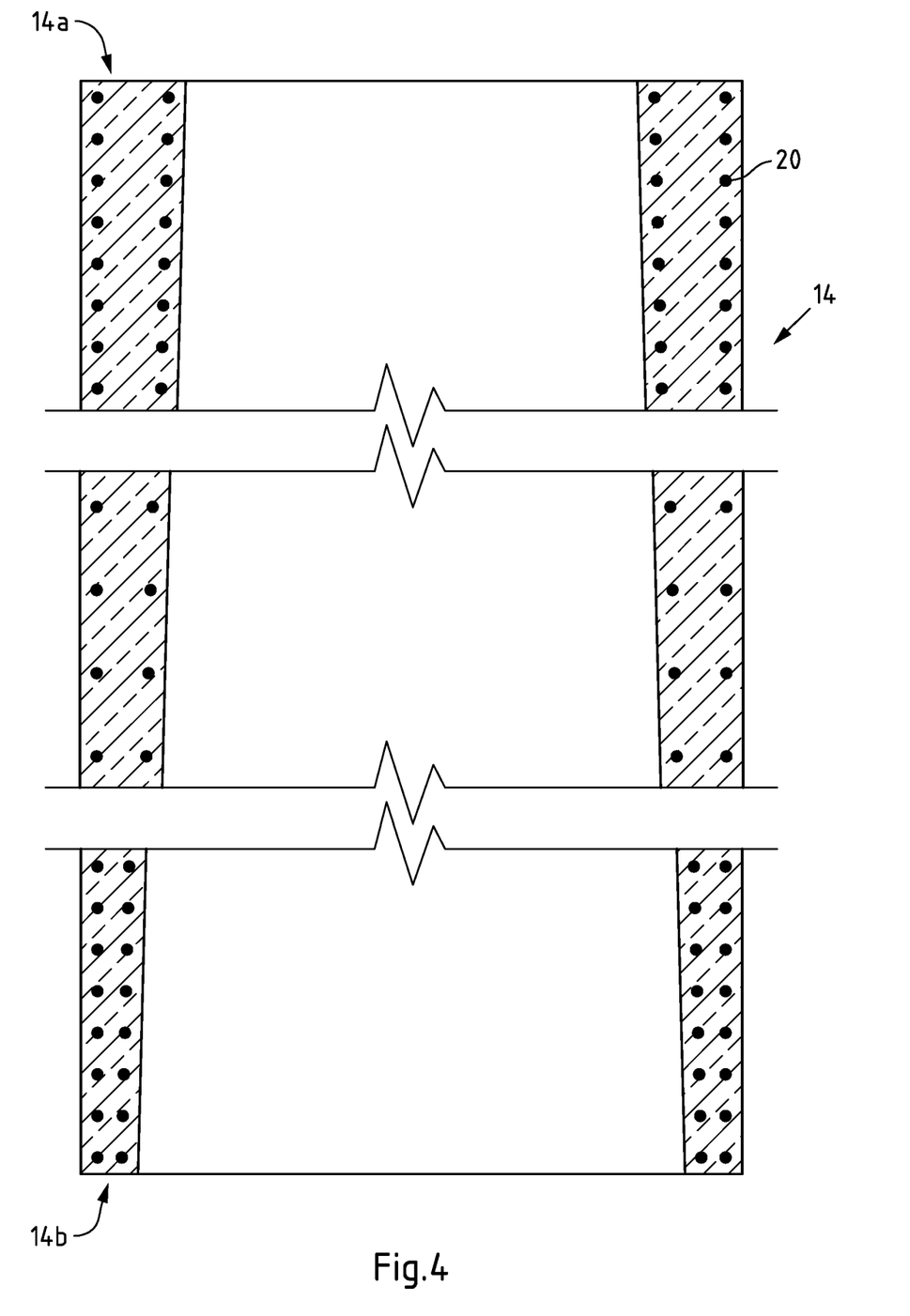
FIG. 4 is a longitudinal section through a wind turbine foundation structure according to an embodiment.

FIG. 4 shows the hollow structural element 14 according to FIG. 3 with its upper end, a central region and its lower end. In the longitudinal section, the reinforcements 20 are drawn. It can be seen that the density of the reinforcement 20 is higher in the upper as well as in the lower end than in a center region.

The taper from the upper end face 14a to the lower end face 14b may be different, as shown in FIGS. 5a-f. It should be noted here that the figures are shown purely schematically and are highly exaggerated to illustrate the principle of the taper. The drawings are neither to scale nor do they show the correct relation of the sizes to each other. Rather, the drawings are merely intended to illustrate the principle.

Figure 5A:
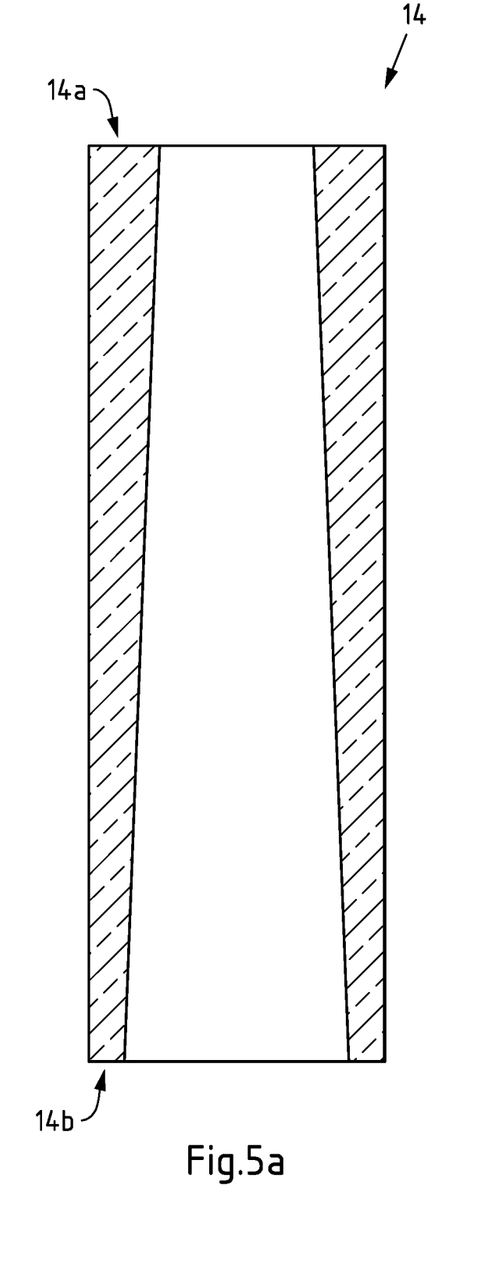
FIGS. 5a-f are schematic elevated views of longitudinal sections through wind turbine foundation structures according to embodiments.

FIG. 5a shows the hollow structural element 14, in which a diameter of an inner shell surface increases steadily from the upper end surface 14a toward the lower end surface 14b. The diameter of the outer shell surface is constant.

Figure 5B:
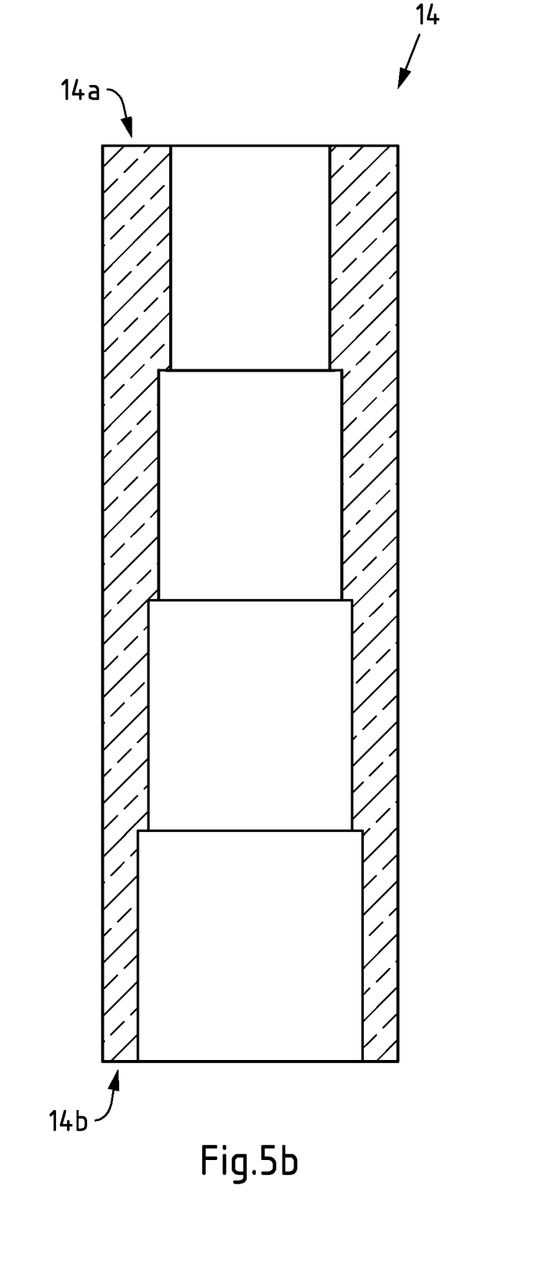

In FIG. 5b, it is shown that an inner diameter of the inner shell surface increases stepwise from the upper end face 14a toward the lower end face 14b. The diameter of the outer shell surface is constant.

Figure 5C:
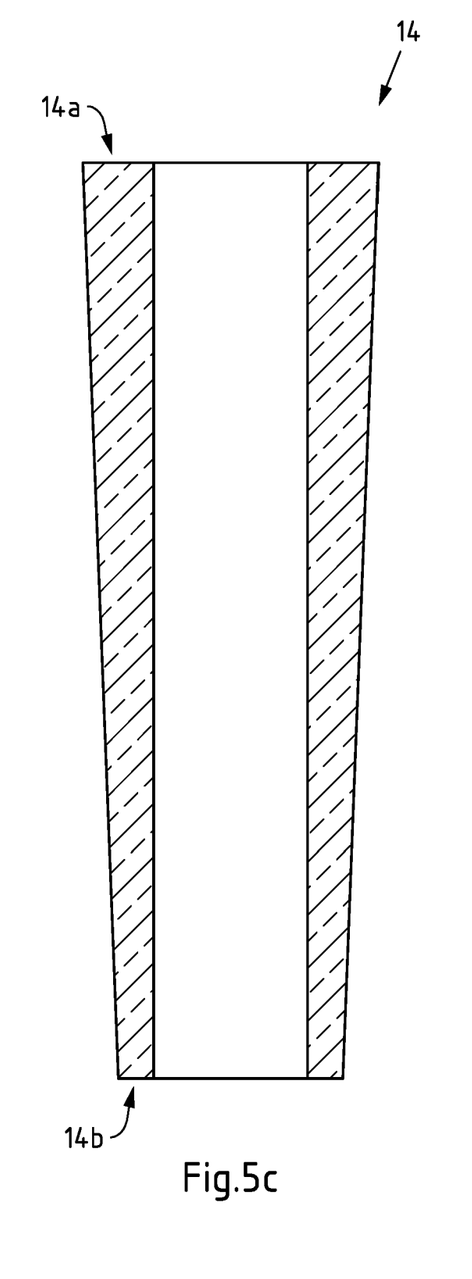

FIG. 5c shows that the diameter of the outer lateral surface decreases steadily from the upper end face 14a to the lower end face 14b. The diameter of the inner lateral surface is constant.

Figure 5D:
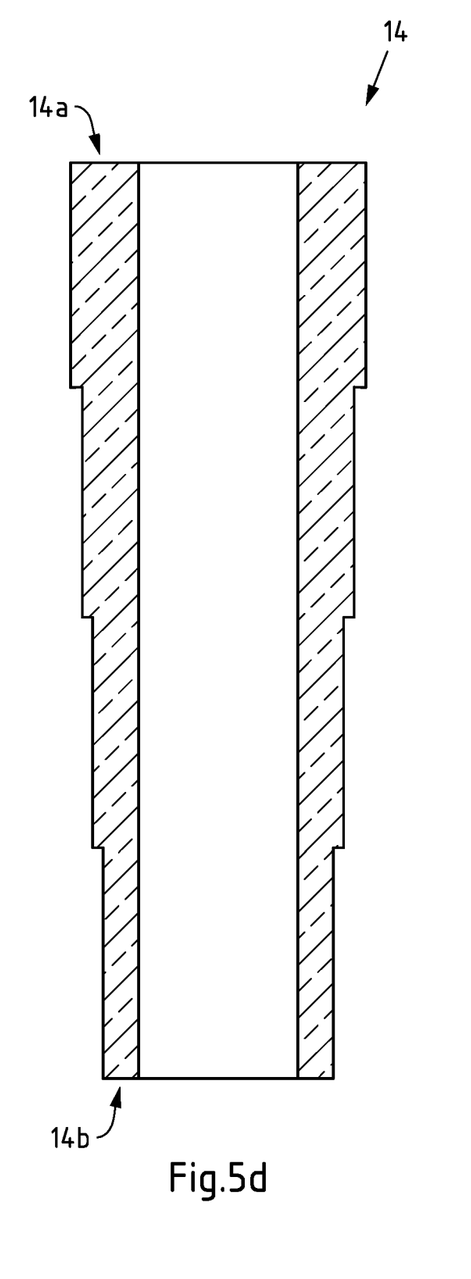

FIG. 5d shows how the diameter of the outer lateral surface decreases in steps from the upper end face 14a to the lower end face 14b. The diameter of the inner shell surface is constant.

Figure 5E:
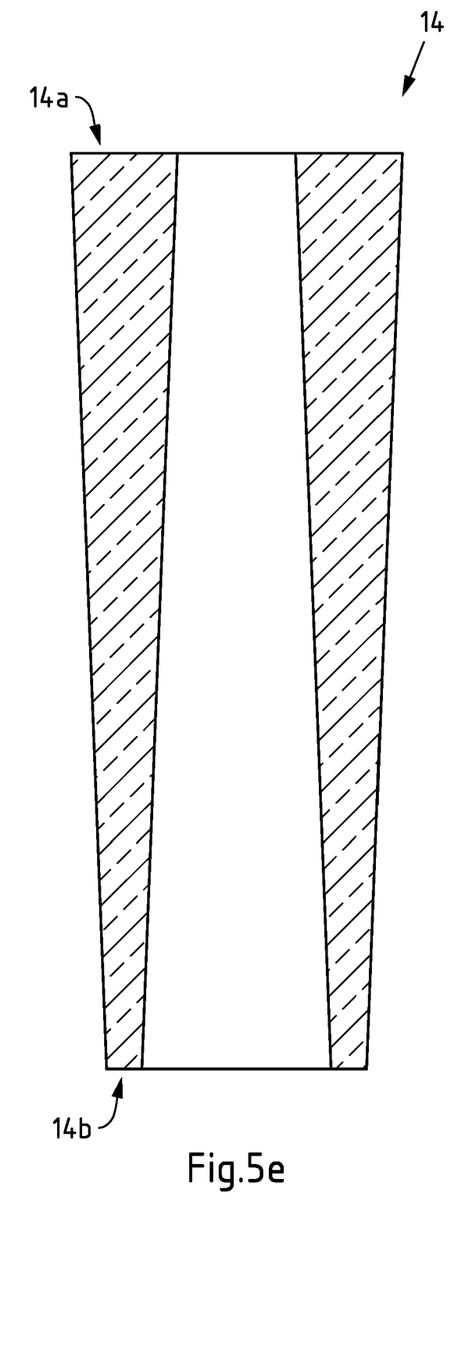

FIG. 5e shows how the diameter of the inner shell surface increases steadily from the upper end face 14a toward the lower end face 14b, and the diameter of the outer shell surface decreases steadily.

Figure 5F:
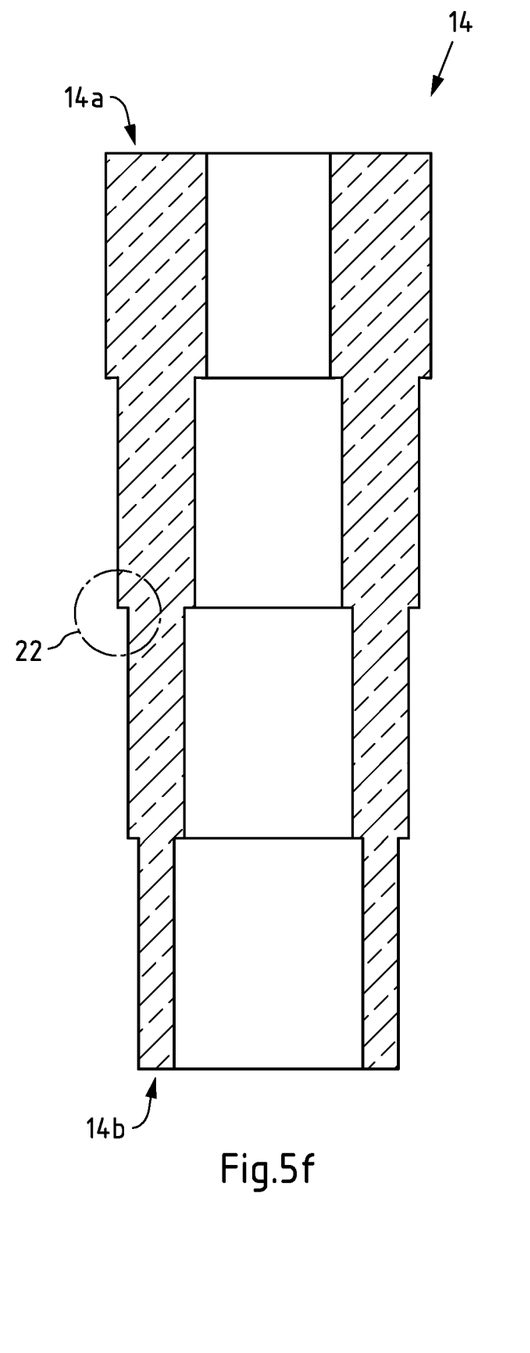

FIG. 5f shows how the inner diameter increases in steps from the upper end face 14a toward the lower end face 14b, and the diameter of the outer shell surface decreases in steps.

Figure 6A:
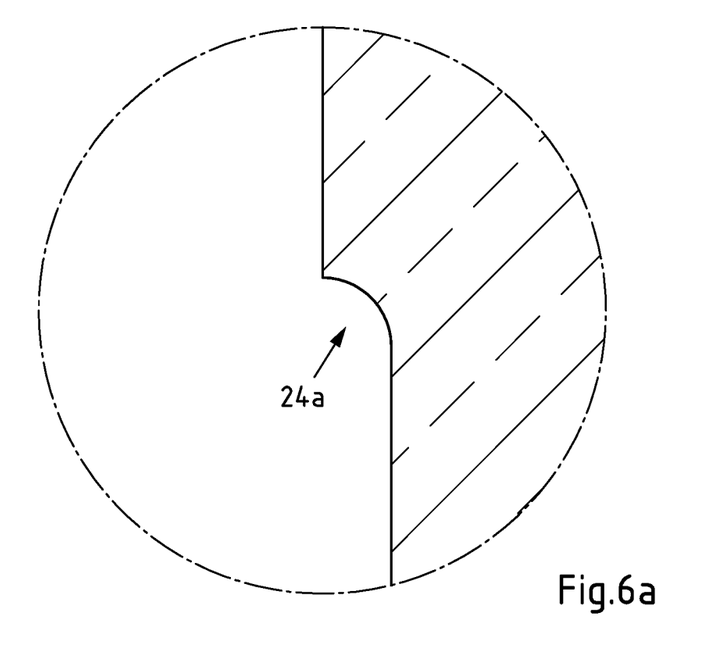
FIG. 6a, b are a detail of a stepped transition.
Figure 6B:
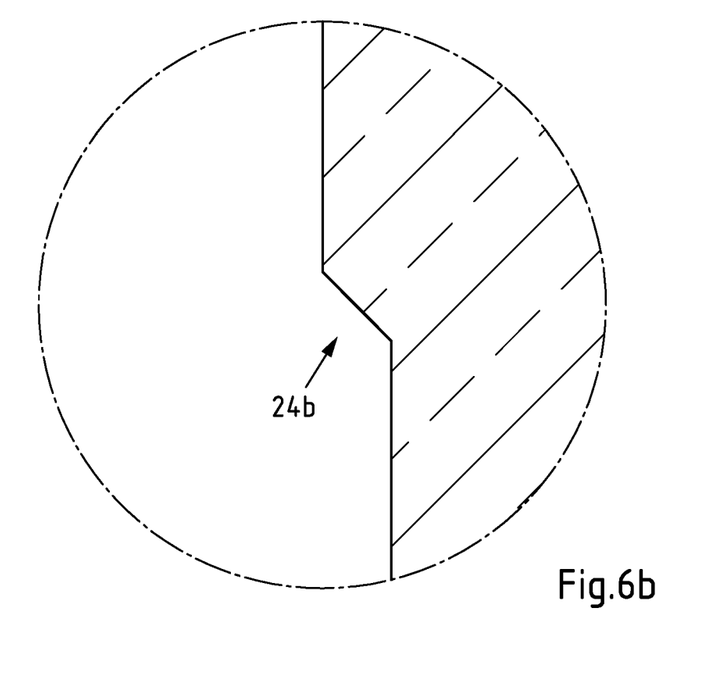

A detail 22 of a step is shown in FIGS. 6a and b. A step according to FIG. 5b, 5d or 5f may be formed as a fillet 24a as shown in FIG. 6a. A step may be formed as a wedge-shaped 24b, as shown in FIG. 6b.

Figure 7:
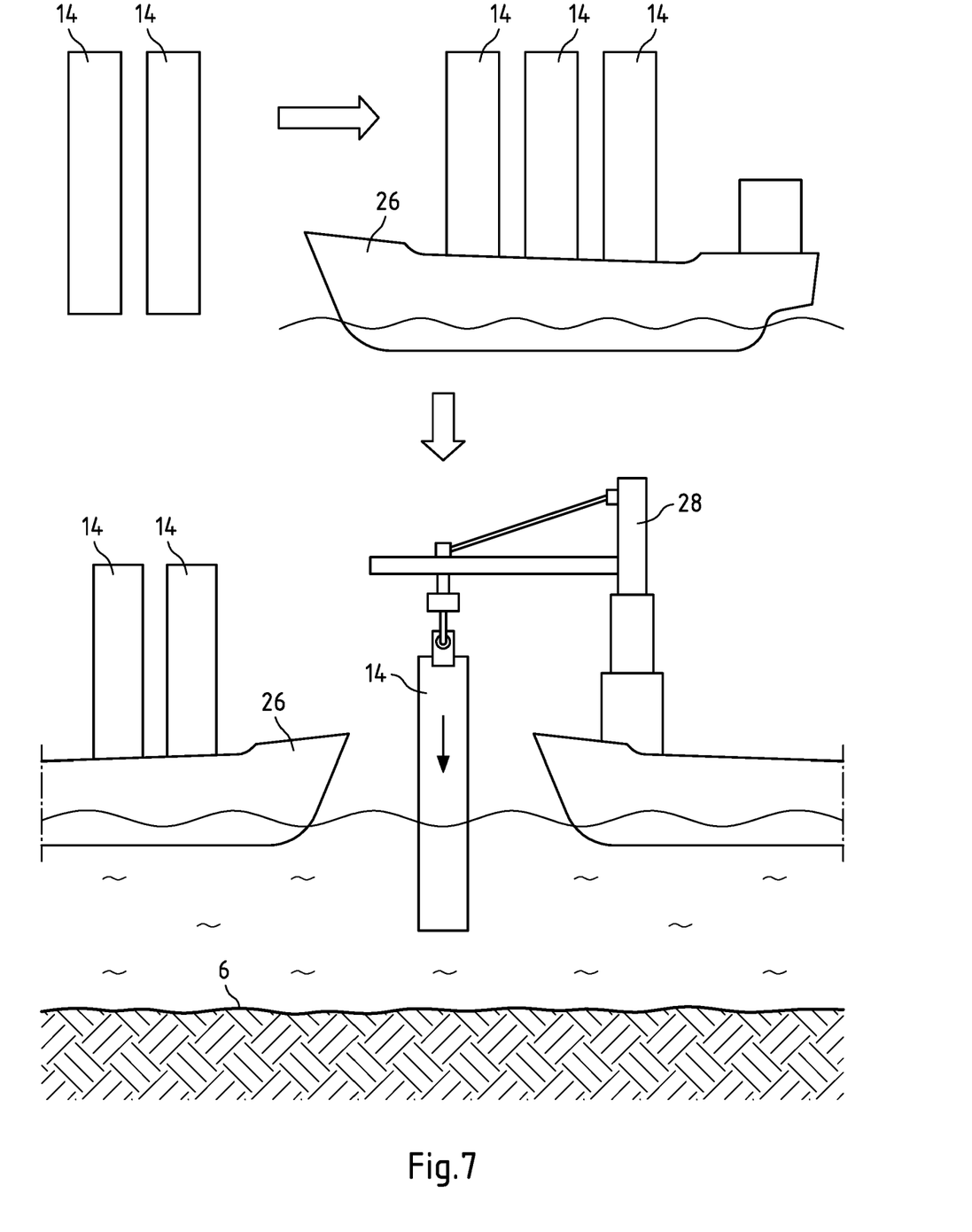
FIG. 7 is the erection of a wind turbine foundation structure according to an embodiment example.

FIG. 7 shows a method of founding a hollow structural element 14 at sea. First, the hollow structural elements 14 are cast from concrete using slipform and jumpform methods and dried in an upright position. Then, the hollow structural elements 14 are rotated once by 180° and loaded onto a ship 26. 20

Standing upright on the ship 26, the hollow structural elements are shipped to an installation site where they are founded using a suitable foundation tool 28. The hollow structural elements 14 are already supported on the ship 26 in such a way that the lower end face 14b is at the bottom and the upper end face 14a is at the top, 25 so that during foundation the lower end face 14b is placed on the seabed 6 and by means of the foundation tool 28 the hollow structural element 14 is rammed into the seabed.

LIST OF REFERENCE SIGNS

2 Wind turbine
4 foundation structure
6 seabed
8 Sea level
10 Transition piece
12 Wind turbine
14 Hollow structural element
14a upper face
14b lower face
16 web
18 collar
20 reinforcement
22 detail
24a fillet
24b Wedge
26 Vessel
28 Foundation tool

What is claimed is:

1. A method of manufacturing a wind turbine foundation structure, the method comprising:
building up a formwork on-shore, wherein an annular gap in the formwork tapers from a first end towards a second end, the annular gap being larger at the first end than the second end,
pouring concrete into the annular gap in the formwork, wherein when the concrete is poured, the first end of the formwork is on a bottom side and the second end of the formwork is on a top side,
curing the concrete such that the cured concrete forms a hollow structural element with a wall thickness having a taper resulting from the taper of the annular gap in the formwork, the hollow structural element having a first end face and a second end face, the first end face being cured adjacent to the first end of the formwork and the second end face being cured adjacent to the second end of the formwork,
rotating the hollow structural element by 180° such that the second end face is on the bottom side and the first end face is on the top side,
shipping the hollow structural element to an offshore installation site, and ramming or vibrating the hollow structural element with the second end face, as seen in an installed condition, into a seabed at the installation site.

2. The method according to claim 1, wherein the concrete is cured in an autoclave.

3. The method according to claim 1, wherein a wall of the hollow structural element is produced in a sliding formwork or in a climbing formwork.

* * * * *